March 28, 1961  P. J. GARDNER  2,976,656
AUTOMATIC HAM PRESS
Filed Dec. 8, 1959  3 Sheets-Sheet 1

INVENTOR
Patrick John Gardner

BY Mason, Fenwick & Lawrence
ATTORNEYS

March 28, 1961 P. J. GARDNER 2,976,656
AUTOMATIC HAM PRESS

Filed Dec. 8, 1959 3 Sheets-Sheet 2

INVENTOR
Patrick John Gardner
BY Mason, Fenwick & Lawrence
ATTORNEYS

INVENTOR
Patrick John Gardner
BY Mason, Fenwick & Lawrence
ATTORNEYS

United States Patent Office 2,976,656
Patented Mar. 28, 1961

2,976,656

AUTOMATIC HAM PRESS

Patrick John Gardner, Ottumwa, Iowa, assignor to John Morrell & Co., Ottumwa, Iowa, a corporation of Maine Filed Dec. 8, 1959, Ser. No. 858,276

6 Claims. (Cl. 53—70)

The present invention relates in general to apparatus for canning whole meat and the like, and more particularly to apparatus for automatically pressing whole meat such as boned hams into cans which are then subjected to subsequent sealing and cooking operations.

While the apparatus of the present invention may be used for pressing various types of meats or solid materials into containers, the apparatus is specifically designed for pressing of whole hams into non-circular cans and the invention will be described and explained with reference to this particular application of the invention without it necessarily being limited to the canning of hams.

One of the early commercial methods for canning hams was to bone the hams and clamp them by pressure into a ham cooker which was in the form of an open top heavy walled vessel having the shape which it was desired for the ham to assume in the can into which they were to be later packed. The ham cooker was fitted with a clamp structure which pressed the ham into the cooker and a large number of such ham-filled cookers were subjected to a precooking operation by immersing the cookers in boiling water for a selected period of time so that the ham shape would be set to permit the hams to be readily transferred to the packaging cans or tins. After transferral of the precooked hams to the packaging can, the can would be evacuated and sealed and the ham thus sealed would be cooked again for a final cooking period.

This procedure was subsequently displaced by a method of the type disclosed in prior U.S. Patents Nos. 2,181,945; 2,224,398; and 2,224,908 wherein the raw ham was placed loosely in a non-oval can and the can was disposed in a ham press which had a pair of relatively movable clamping jaws having clamping surfaces conforming to the contour of the sides of the can to be moved into a position abutting the can sides to support the can sides against bulging, and a reciprocative plunger which could be forced downwardly under pneumatic or hydraulic pressure to engage the ham through the upwardly opening end of the can in a manner which would press the ham downwardly to substantially fill the entire can to remove any entrapped air in the ham and to seat the ham in the can in such a way that the lid could be placed on the can.

This last-mentioned procedure required an operator for each of the ham presses and a manual operating procedure which was time-consuming and introduced a substantial labor factor into the cost of processing hams in that manner. For example, the operator was required to place a can of the meat on the base of the ham press, manually close and lock the jaws which support the sides of the can during pressing, manually operate valves which actuated the ram that pressed the ham downwardly in the can, manually release the valves and unlock the jaws, and remove the filled can from the press.

An object of the present invention is the provision of novel apparatus for pressing hams down into the packaging can therefor in an automatic manner to minimize the manual steps involved in ham pressing procedures.

Another object of the present invention is the provision of an atuomatic ham press of novel construction wherein the various components are activated automatically in a selected time and sequence relationship in response to conveyance of a ham-filled can into press position within the apparatus.

Another object of the present invention is the provision of novel apparatus for pressing hams into packaging cans therefor wherein an automatically regulated sequence of steps under control of electrical and pneumatic means are performed to press the hams into the cans, in order to increase the number of hams that can be pressed in a given time and give greater uniformity of press.

Other objects, advantages and capabilities of the present invention will become apparent from the following detail description taken in conjunction with the accompanying drawings illustrating one preferred embodiment of the invention.

Figure 1:
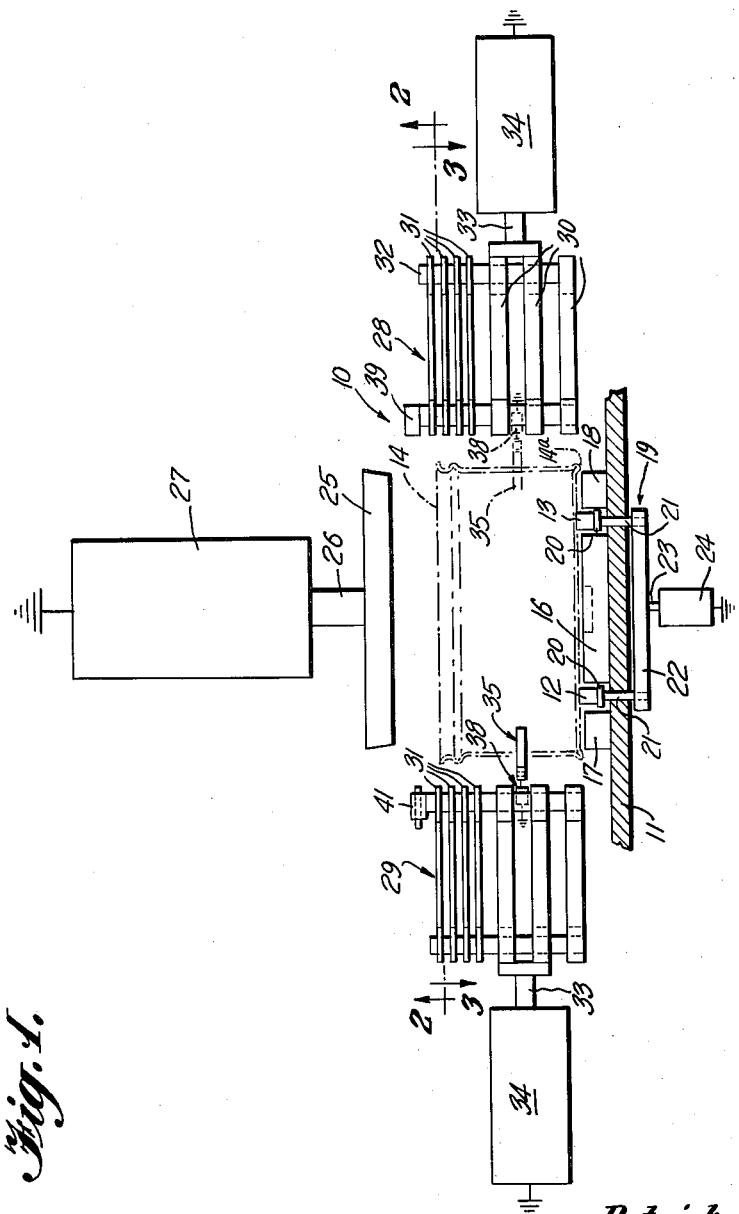
Figure 1 is a diagrammatic view with parts shown in side elevation and parts in section of an automatic ham press embodying the present invention.
Figure 2:
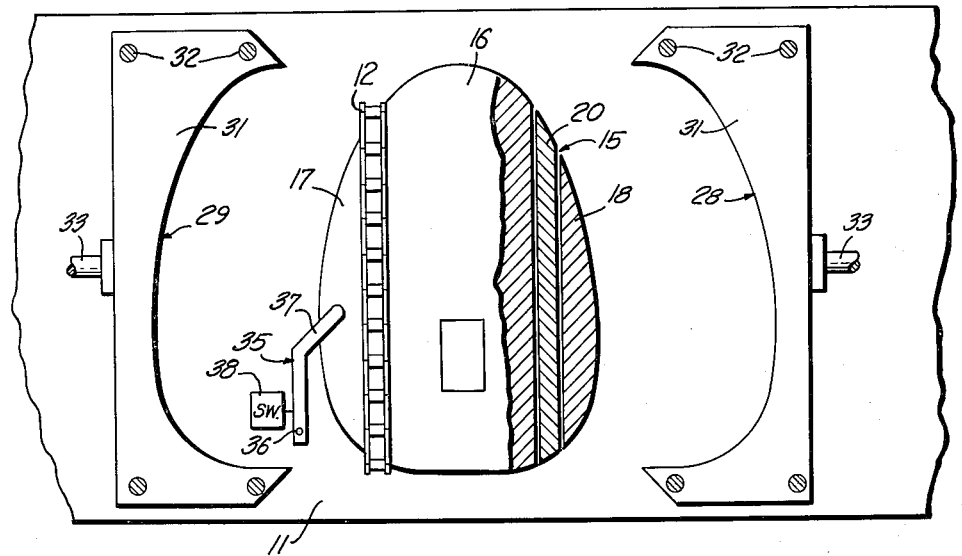
Figure 2 is a fragmetnary horizontal section view taken along the line 2—2 of Figure 1.

Referring to the drawings wherein like reference characters designate corresponding parts throughout the several figures, the ham press apparatus, indicated generally by the reference character 10, comprises a machine base 11 over which a pair of endless conveyor chains 12 and 13 travel to convey a can or "tin" 14 which has been loosely prefilled with the raw ham along the work path. The conveyor chains 12, 13 pass through grooves 15 formed between a central base plate section 16 and lateral base plate sections 17 and 18 secured to the machine base 11 and forming a composite profile in plan which conforms to the inwardly disposed crimp 14a bounding the lower edge of the can 14. The conveyor chains 12, 13 are normally supported during movement of the cans over the base plate sections 16–18 at an elevated position wherein the bottom of the can 14 is spaced slightly above the upper surfaces of the base plate sections by means of a conveyor chain elevating assembly indicated generally by the reference character 19 and including wear plates 20 upon which the conveyor chains 12, 13 travel together with suitable supporting posts 21 extending vertically through accommodating apertures in the machine base 11 and slidable therein, the upper ends of the supporting posts being fixed to the wear plates 20 and their lower ends being fixed in an elevator plate 22 fixed to the piston shaft 23 of a chain elevating air cylinder 24 disposed below the machine base 11.

Spaced above and disposed in vertical alignment with the base plate sections 16–18 defining the press station for the cans 14 is a ram or plunger plate 25 which may have a flat lower surface and a profile in plan conforming to the non-circular contour defined by the inner wall surfaces of the cans 14, which is supported for axial reciprocation on a piston shaft 26 driven by the pneumatic press cylinder 27.

A pair of transversely reciprocative clamping jaw assemblies 28, 29 are disposed in laterally flanking relation to the press station and base plate sections 16–18 to move transversely of the conveyor axis into engagement with the side walls of the can 14 and prevent deformation of the can when the plunger plate 25 forces the ham downwardly in the can 14 occupying the press station. The clamping jaw assemblies 28, 29 each comprise a plurality of lower clamping jaw plates 30 and a plurality of upper clamping jaw plates 31, the plates 30 and 31 being identical in profile and being disposed in parallel horizontal planes in vertical alignment with each other spaced vertically to span the maximum heights of cans 14 in which the hams are to be pressed.

It should be stated here that hams will vary in weight and size, and that different sizes of cans are provided, the ultimate volume of which, when sealed, conform to the volume of the hams to be accommodated therein. It is common practice to provide a series of cans which have the same bottom area and bottom profile, but which vary in height by preselected increments to accommodate the various sizes of hams to be encountered. The lower clamping jaw plates 30 are considerably thicker than the upper jaw plates 31, and are spaced so as to engage the major portion of the sides of cans of minimum height, and the thinner upper clamping jaws 31 are spaced at appropriate intervals to provide clearance for the lips of the cans of greater heights than the minimum size can. The clamping jaw plates 30 and 31 of each jaw assembly 28, 29 are secured together in a unitary assembly by vertical posts 32 preferably disposed at the four corners of the jaw plates, and these jaw assemblies 28, 29 are rigidly supported on and carried by piston shafts 33 of the pneumatic jaw cylinders 34.

An automatic cycle-initiating lever 35 is pivotally supported on a pivot post 36 to one side of the press station, the lever 35 having an inwardly inclined terminal section 37 which extends into the path of the cans 14 conveyed along the chains 12, 13. The lever 35 is coupled to and actuates a cycle-initiating switch 38 when the widest part of the can 14 contacts the inclined leg 37 of the lever 35 to initiate an automatic cycle of the apparatus controlled by various electrical electrical pneumatic devices to be later described. The adjustment of the lever 35 and switch 38 is such that the automatic cycle is initiated only when the can 14 is in precise vertical registry with the base plate sections 16, 17 and 18 and with the plunger plate 25. It will be appreciated that two such levers 35 and associated switches 38 may be providing in flanking relation to the press station if desired.

Figure 3:
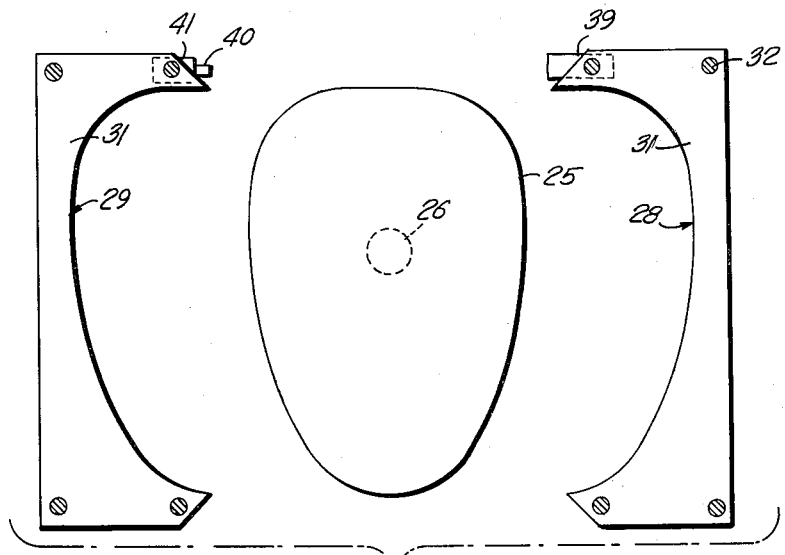
Figure 3 is a horizontal section view taken along the line 3—3 of Figure 1.

The clamping jaw assemblies will of course, be grounded electrically, and one of the jaw assemblies, for example, the jaw assembly 28, carries a metallic block 39 on one of the posts 32 thereof, as illustrated in Figures 1 and 3, which coacts with a spring loaded, electrically conductive metallic plunger 40 slidably mounted on a post 32 of the other jaw assembly 29 to establish an electrical circuit from the plunger 40 through the metallic block 39 to electrical ground when the jaw assemblies 28, 29 come completely together around the can 14 at the press station. The block 39 and plunger 40 thus form the contacts of what may be termed a jaw switch, designated by the reference character 42 in Figure 4.

Figure 4:
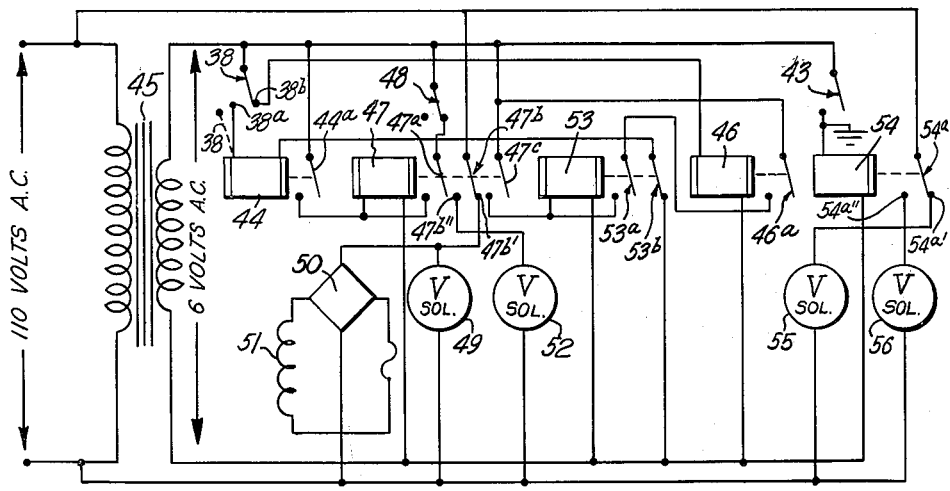
Figure 4 is a schematic diagram of one form of electrical control circuit which may be used with the present invention.
Figure 5:
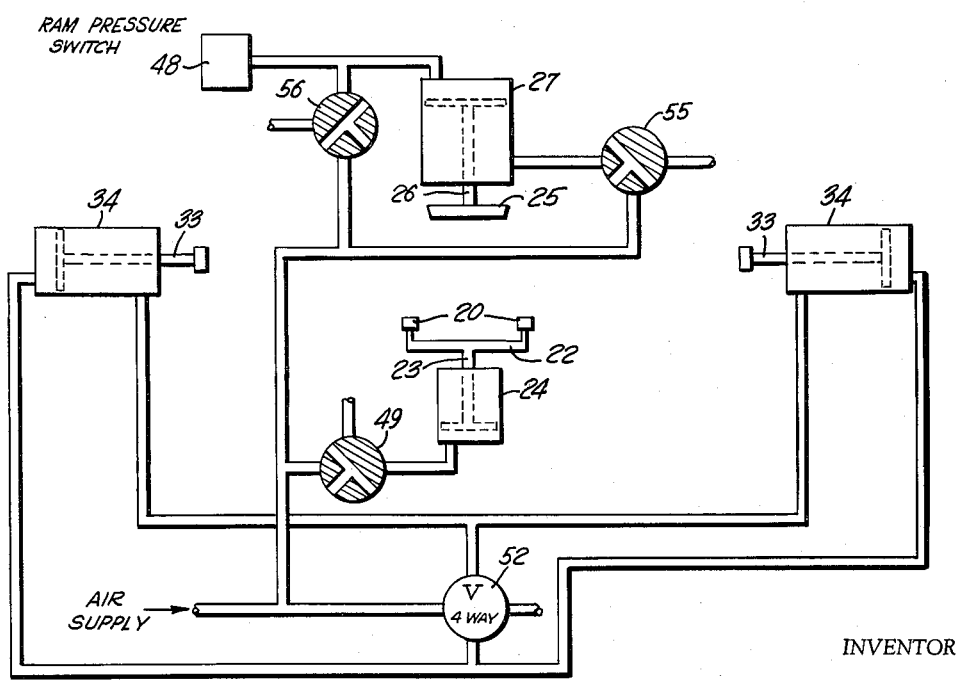
Figure 5 is a pneumatic circuit diagram showing an exempliary pneumatic circuit for controlling various components of the apparatus.

Referring now to the electrical and pneumatic operation of the ham press, with particular reference to Figure 4 illustrating an exemplary form of an electrical control circuit which may be used with the ham press, and Figure 5 illustrating one exemplary form of pneumatic circuit, it will be noted from Figure 4 that the cycle initiating switch 38, or two cycle initiating switches 38 if two levers 35 be used (the second switch 38 being illustrated in broken lines in Figure 4) are disposed in series circuit relation with the coil of a relay 44 across a six volt alternating current supply obtained for example by a step-down transformer 45 whose primary is coupled to a 110 volt A.C. supply. The coil of relay 44 is connected in circuit with the stationary contact 38a of switch 38 which is in normally open circuit relation, and the normally closed stationary contact 38b of switch 38 is connected in series circuit relation with the coil of relay 46 across the six volt A.C. supply. The normally open contacts 44a of the relay 44 are connected in series with the coil of a relay 47 across the six volt supply and an alternate supply circuit for the coil of relay 47 parallels the relay contacts 44a and includes the holding contacts 47a of relay 47 and the normally closed ram pressure switch 48 which is subjected to the air pressure in the upper end of the press cylinder 27 to open when the pressure reaches a preselected level.

The relay 47 additionally includes contacts 47b and 47c, the contacts 47b including a normally closed stationary contact 47b' connected in the 110 volt A.C. supply circuit to a three-way solenoid valve 49 which, as illustrated in Figure 5, controls the pneumatic supply to the chain elevating cylinder 24, and to a rectifier bridge 50 providing direct current for energizing the clutch coil 51 interposed in the driving train for the conveyor chains 12, 13, the conveyor clutch decoupling the drive to the conveyor chains 12, 13 and causing them to stop when the clutch coil 51 is deenergized. The normally open stationary contact 47b" is in the 110 volt supply circuit to a four-way solenoid valve 52 which controls the pneumatic supply circuit to the jaw cylinders 34. The contacts 47c of the relay 47 are in the six volt supply circuit to the coil of relay 53, there being an alternate supply path to the coil of relay 53 paralleling the contacts 47c which includes the normally open holding contacts 53a of the relay 53 and the normally open contacts 46a of the relay 46. The normally closed contacts 53b of the relay 53 are also connected in the series supply circuit for the coil of relay 44.

The normally open jaw switch 43 which is closed when the jaw assemblies 28, 29 come completely together around the can 14 is in the six-volt supply circuit of the coil of a relay 54 having contacts 54a including a normally closed stationary contact 54a' in the 110 volt supply circuit for a three-way solenoid valve 55 which, as illustrated in Figure 5, regulates pneumatic pressure to the press cylinder 27 to lift the ram or plunger plate 25, and the normally open stationary contact 54a" is in the 110 volt supply circuit of a three-way solenoid valve 56 which regulates pneumatic pressure to the press cylinder 27 to force the plunger plate 25 down.

When the cycle initiating switch or switches 38 are closed by arrival of a can 14 at the press station, the relay 46 is deenergized and the relay 44 is energized. This open circuits the contacts 46a of relay 46, and closes contacts 44a of relay 44. Closing of contacts 44a energizes relay 47 which then holds in energized condition by closing of its contacts 47a completing a supply circuit through the latter contacts and the normally closed ram pressure switch 48. Contacts 47c also close upon energization of relay 47, which energizes relay 53. Relay 53 will then hold through its closed contacts 53a and the now closed contacts 46a of relay 46. Normally closed contacts 53b then open, which deenergizes the coil of relay 44 rendering the hold circuit of relay 47 responsive to the ram pressure switch 48. Energizing of the relay 47 also switched the contacts 47b, open circuiting the stationary contact 47b' and deenergizing the conveyor clutch coil 51 and the solenoid valve 49 controlling pressure to the chain elevating cylinder 24. Thus when the can 14 activated the cycle initiating switch 38 upon arrival at the press station, the switching of the relay contacts 47b through the above-described chain of functions deenergized the coil 51 to stop the drive to the conveyor chains 12, 13 and deenergized the solenoid valve 49 to exhaust air from the cylinder 24 and let the elevator plate 22 and wear plates 20 fall to allow the chains 12, 13 to drop into the slots 15 between the base plate sections 16, 17 and 18, and lower the can 14 onto these base plate sections.

This action of the arm contacts 47b also close the circuit to the stationary contact 47b" which energizes the solenoid valve 52 to shift pneumatic pressure to the jaw cylinders 34 in a manner to drive their pistons 33 and the jaw assemblies 28, 29 toward each other to contact the sides of the can 14. When the jaws 28, 29 are completely closed, the jaw switch 43 closes by contact of the plunger 40 with the block 39, energizing the relay 54 to switch the relay contacts 54a. This switching of the contacts 54a open circuits the stationary contact 54a' to deenergize the solenoid valve 55 and exhaust air from the lower end of the press cylinder 27, and completed the circuit to the stationary contact 54a" energizing the solenoid valve 56 and admitting air to the upper end of the press cylinder 27 to drive the ram or plunger plate 25 downward and press the meat in the can 14. The ram pressure switch 48 is open circuited when the air pressure in the upper end of the press cylinder 27 builds up to a set value which opens the holding circuit through the relay contacts 47a to the coil of relay 47 and deenergizes this relay. This switches the contacts 47b back to the initial position illustrated in Figure 4, whereupon the solenoid valve 52 is deenergized to reverse the application of air pressure to the jaw cylinder 34 and withdraw the jaws 28, 29 from each other, and energizes the solenoid valve 49 and clutch coil 51 to apply pressure to the chain elevating air cylinder 24 to lift the chains 12, 13 and the can 14 off of the base plate sections 16, 17 and 18 and recouple the drive to the conveyor chains. Simultaneously, as the jaws 28, 29 withdraw from each other, the jaw switch 43 opens which deenergizes the relay 54 to switch the contacts 54a back to the original position illustrated in Figure 4, deenergizing the solenoid valve 56 and energizing the solenoid valve 55 to return the ram or plunger plate 25 upwardly to its initial position.

As the can 14 leaves the press station, the cycle initiating switch 38 (or switches) returns to its normal open position, deenergizing relay 46 which in turn open circuits the holding circuit for the relay 53 through the contacts 46a and 53a. Deenergizing of the relay 53 causes the contact 53b to close which then enables the relay 44 to be energized upon the next closing of the cycle initiating switch 38.

By this arrangement, the need for an operator to manually perform the various stages required in connection with the prior art ham presses is completely eliminated as all of the functions necessary to an effective press operation are performed automatically in the desired sequence by the electrical and pneumatic control circuits. A more uniform press can be achieved, since the termination of the downward stroke of the ram or plunger plate 25 is automatically effected in response to the pressure which builds up in the upper end of the press cylinder 27. This device permits the realization of substantial reduction in the production cost of canned hams and the like by the elimination of the manual labor required in performing these operations by the prior art methods and the substantial increase in the number of hams that can be pressed in a given time with the automatically controlled apparatus.

While but one preferred example of the present invention has been particularly shown and described, it is apparent that various modifications may be made therein within the spirit and scope of the invention and it is desired, therefore, that only such limitations be placed on the invention are imposed by the prior art and set forth in the appended claims.

What is claimed is:

1. Apparatus for canning meat and like solid material comprising a base for positioning an upwardly opening can with its bottom on said base and having a press station at which the can is to be located for compressing meat therein, conveyor means passing through the press station for delivering cans in succession to the press station, drive means for said conveyor, movable means shiftable transversely of the conveyor means to encompass the sides of the cans to prevent deformation thereof, first reciprocation means for said movable means to project the same into engagement with the can sides and withdraw the movable means therefrom, a plunger movable into and out of the open top of the can when the can occupies the press station, the plunger covering substantially all of the open area of the can with slight clearance space between its periphery and the interior surfaces of the can sides, second reciprocating means for said plunger for shifting the plunger downwardly into the can and withdrawing the plunger therefrom, cyclic control means for said conveyor drive means and said first and second reciprocating means including cycle initiating means responsive to registry of the cans on said conveyor means with said press station to successively interrupt movement of the conveyor, shift said movable means into engagement with the can sides, reciprocate said plunger into and out of the can, withdraw said movable means form engagement with the can sides, and resume movement of the conveyor means.

2. Apparatus for canning meat and like solid material comprising in combination a base for positioning an upwardly opening can having vertical sides with its bottom on said base, said base having a press station with which cans are successively to be registered, conveyor means passing through said press station to deliver cans successively thereto, drive means for said conveyor mean, relatively movable jaw assemblies supported for reciprocation along axes lying transversely of the axis of movement of the conveyor means, jaw assembly reciprocating means for projecting said jaw assemblies into encompassing engagement with the sides of the can at the press station and withdrawing the jaw assemblies therefrom, a plunger movable along a vertical axis into and out of the open top of the can at the press station, said plunger covering substantially all of the open area of the can with slight clearance between its periphery and the interior surfaces of the can sides, plunger reciprocating means, and cyclic control means for said drive means, said jaw assembly reciprocating means and said plunger reciprocating means including cycle initiating means responsive to registry of a can with the press station to activate said drive means to interrupt movement of the conveyor, activate the jaw assembly reciprocating means, to shift the jaw assemblies into engagement with the can sides and withdraw the same therefrom after a selected dwell period, reciprocate said plunger into and out of the can during said dwell period, and resume movement of the conveyor.

3. In apparatus for canning meat, the combination recited in claim 2 wherein said jaw assembly reciprocating means and said plunger reciprocating means each comprise a cylinder having piston means associated therewith responsive to fluid pressure to shift the piston means, and wherein said cyclic control means includes a fluid circuit having electrically controlled valves for applying fluid to said cylinders to effect reciprocation of said jaw assemblies and said plunger, and electrical circuit means activated by said cycle initiating means to condition said electrically controlled valves in selected sequence.

4. Apparatus for canning meat and like solid material comprising in combination a base for positioning an upwardly opening can having vertical sides with its bottom on said base, said base having a press station with which cans are successively to be registered, conveyor means passing through said press station to deliver cans successively thereto, drive means for said conveyor means, relatively movable jaw assemblies supported for reciprocation along axes lying transversely of the axis of movement of the conveyor means, jaw assembly reciprocating means for projecting said jaw assemblies into encompassing engagement with the sides of the can at the press station and withdrawing the jaw assemblies therefrom, a plunger movable along a vertical axis into and out of the open top of the can at the press station, said plunger convering substantially all of the open area of the can with slight clearance between its periphery and the interior surfaces of the can sides, plunger reciprocating means, cyclic control means for said drive means, said jaw assembly reciprocating means and said plunger reciprocating means including cycle initiating means responsive to registry of a can with the press station to activate said drive means to interrupt movement of the conveyor, activate the jaw assembly reciprocating means to shift the jaw assemblies into engagement with the can sides and withdraw the same therefrom after a selected dwell period, reciprocate said plunger into and out of the can during said dwell period, and resume movement of the conveyor, each of said cans having a non-circular bottom bounded by a downwardly projecting crimp, said base including a raised base plate conforming to the profile of said bottom to nest against the bottom within said crimp when the can occupies said pressed station, said conveyor means comprising a pair of laterally spaced parallel chains, said base plate having a central section and two lateral sections spaced from said central section to provide grooves for accommodating said conveyor chains, wear plates disposed within each of said grooves underlying and supporting said chains, a cylinder disposed below said base and base plate having an axially reciprocative piston responsive to fluid pressure coupled to said cylinder, means interconnecting said piston in supporting relation to said wear plates to shift said wear plates vertically within said grooves by movement of said piston, and said cyclic control means including means responsive to said cycle initiating means and operative substantially simultaneously with interruption of movement of said conveyor for activating said last-mentioned cylinder and piston to lower said chains and the can occupying said press station onto said press base and to elevate said chains and the can above said base plate substantially simultaneously with resumption of movement of the conveyor means.

5. Apparatus for canning meat and like solid material comprising in combination a base for positioning an upwardly opening can having vertical sides with its bottom on said base, said base having a press station with which cans are successively to be registered, conveyor means passing through said press station to deliver cans successively thereto, drive means for said conveyor means, relatively movable jaw assemblies supported for reciprocating along axes lying transversely of the axis of movement of the conveyor means, jaw assembly reciprocating means for projecting said jaw assemblies into encompassing engagement with the sides of the can at the press station and withdrawing the jaw assemblies therefrom, a plunger movable along a vertical axis into and out of the open top of the can at the press station, said plunger covering substantially all of the open area of the can with slight clearance between its periphery and interior surfaces of the can sides, plunger reciprocating means, cyclic control means for said drive means, said jaw assembly reciprocating means and said plunger reciprocating means including cycle initiating means responsive to registry of a can with the press station to activate said drive means to interrupt movement of the conveyor, activate the jaw assembly reciprocating means to shift the jaw assemblies into engagement with the can sides and withdraw the same therefrom after a selected dwell period, reciprocate said plunger into and out of the can during said dwell period, and resume movement of the conveyor, said jaw assemblies each being formed of a plurality of vertically aligned and spaced horizontal plates of corresponding profile having concave can-abutting faces along a corresponding edge thereof for engaging the can sides along a plurality of vertically spaced horizontally extending regions, the plates forming each jaw assembly being spaced apart sufficient distances to provide clearance for the lips of cans of varying heights.

6. In apparatus for canning meat, the combination recited in claim 2 wherein said cycle initiating means comprises a pivoted lever having an arm extending into the path of movement of the cans at said press station to be shifted laterally outwardly from the press station by engagement with the can sides, and an electrical switch intercoupled with said lever to be actuated thereby upon selected outward movement of said lever.

References Cited in the file of this patent

UNITED STATES PATENTS

| | | |
|---|---|---|
| 2,224,908 | Griffith | Dec. 17, 1940 |
| 2,911,776 | Sada | Nov. 10, 1959 |
| 2,916,862 | Otto | Dec. 15, 1959 |